Oct. 31, 1961     T. L. BERRY     3,006,186
FREE POINT INDICATOR FOR DETERMINING THE POINT AT
WHICH STUCK PIPE IS FREE IN A WELL
Filed April 29, 1957     3 Sheets-Sheet 1
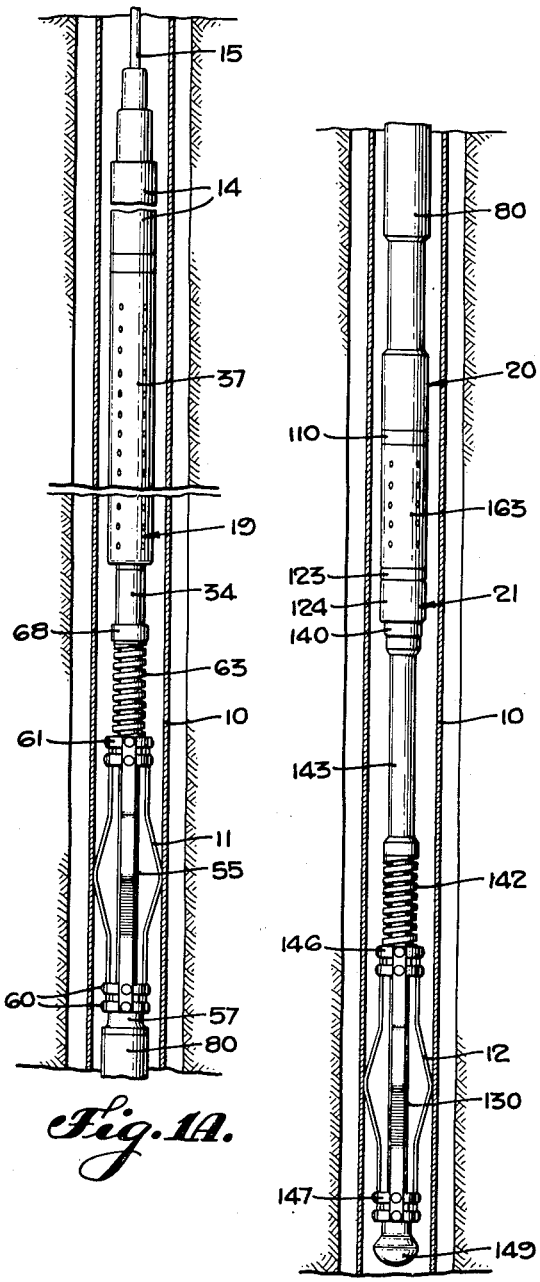
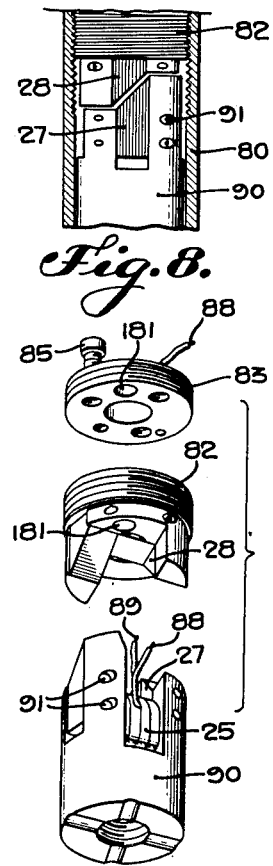
THEODORE L. BERRY,
INVENTOR.
BY
Hazard & Miller
ATTORNEYS

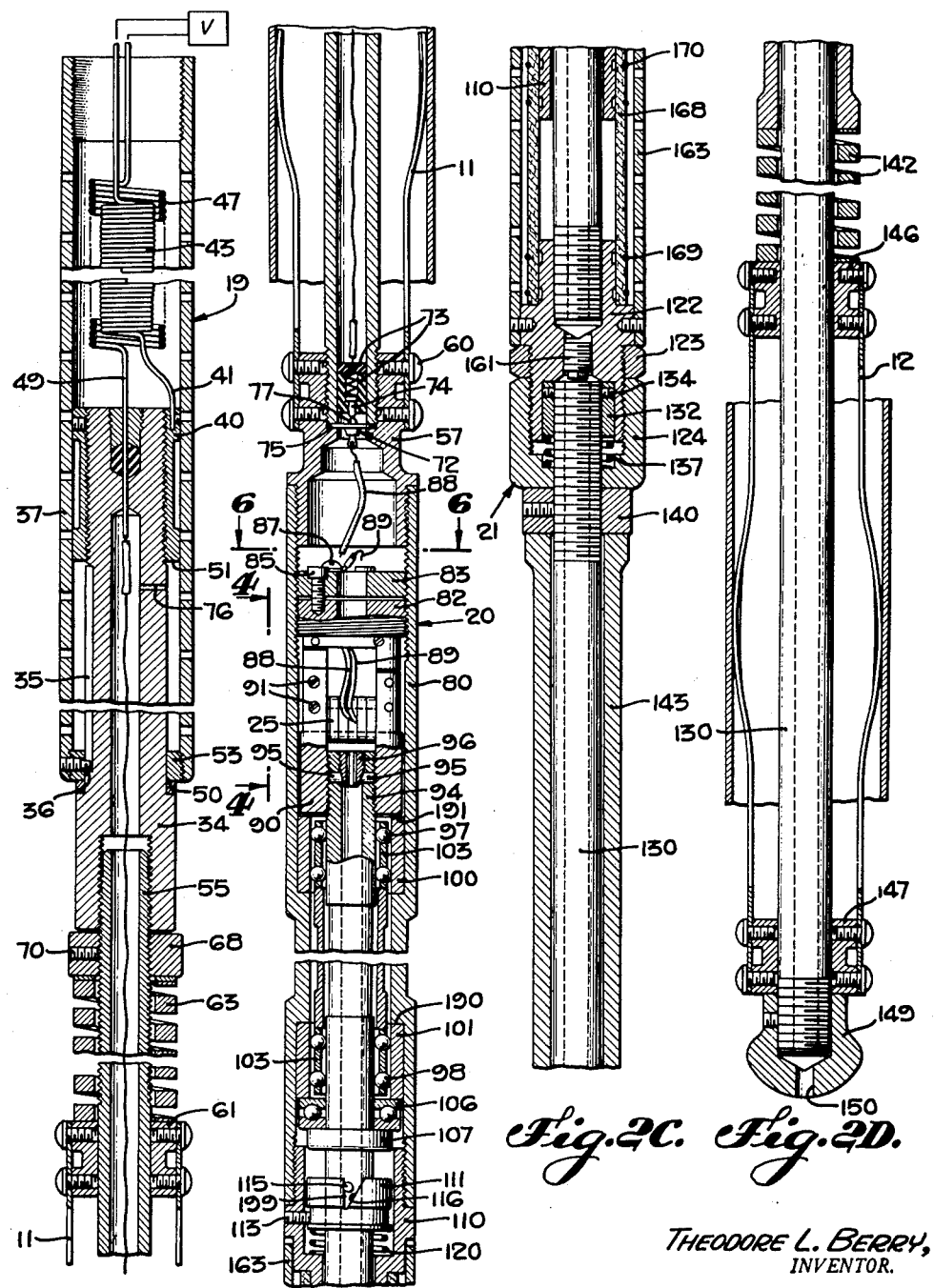

Oct. 31, 1961 T. L. BERRY 3,006,186
FREE POINT INDICATOR FOR DETERMINING THE POINT AT
WHICH STUCK PIPE IS FREE IN A WELL
Filed April 29, 1957 3 Sheets-Sheet 3

THEODORE L. BERRY,
INVENTOR.

BY
Hazard & Miller
ATTORNEYS

United States Patent Office 3,006,186
Patented Oct. 31, 1961

3,006,186
FREE POINT INDICATOR FOR DETERMINING THE POINT AT WHICH STUCK PIPE IS FREE IN A WELL
Theodore L. Berry, Santa Fe Springs, Calif., assignor to The Dia-Log Tubular Survey Company, Whittier, Calif., a partnership
Filed Apr. 29, 1957, Ser. No. 656,478
18 Claims. (Cl. 73—151)

This invention relates to apparatus and methods for determining the point or points at which drill pipe, casing, or tubing or the like is stuck in a well, and the point or points at which drill pipe, casing, tubing, and the like is free in the well.

This application is a continuation-in-part of my copending application Serial No. 130,535, filed December 1, 1949 (since forfeited).

There are various reasons for wanting to know the location of the free point or points of drill pipe, casing, tubing, and the like but in general, these reasons concern either the removing of the free pipe above the stuck point or the washing out or freeing the pipe or to perform various operations at the stuck point with or without removal of the drill pipe, casing, tubing, or the like. For convenience throughout the specification, the term "pipe" will be used to include casing, tubing, drill pipe, and the like.

One method of removing the free pipe has been by subjecting the pipe to a predetermined amount of torque and then exploding a charge at the first free joint above the stuck point to thereby break the joint allowing the free pipe to be unscrewed and removed from the well. It has been proposed that the pipe in the well can be stretched and then by some suitable mechanism measurements taken to determine the stuck point. However, this method has proved unsatisfactory in some instances where the pipe was indicated to be free because the condition of the hole prevented the torque applied at the surface from reaching the joint which was indicated to be free and from being effective to unscrew the joint. That is, due to the conditions of the hole above the stuck point, the torque applied was not sufficient at the free joint above the stuck point to unscrew the free pipe when the free joint was subjected to an explosive charge although under other hole conditions the same torque applied at the surface would be sufficient. There are then conditions within the well which cannot be determined merely by stretching the pipe longitudinally but these conditions can be determined by twisting the pipe. It is also possible that a torque twist will not show certain conditions that will be uncovered by longitudinally stretching the pipe. It is, therefore, a main object of the present invention to provide an apparatus whereby the condition of the pipe can be determined by both twisting the pipe and longitudinally stretching or compressing the pipe.

Another object of the present invention is to provide an improved apparatus for determining the free point of pipe when the pipe is longitudinally stretched or compressed.

Another object of the present invention is to provide an improved apparatus for determining the free point of a pipe when the pipe is twisted.

Another object of the present invention is to provide an improved means of setting the instrument of the present invention while it is located down in the well.

Another object of the present invention is to provide improved methods of determining the stuck and free points of pipe in a well.

Another object of the present invention is to provide an improved manner of allowing longitudinal and rotational movement of the various parts of a measuring tool while maintaining the parts of the tool in alignment.

Another object of the present invention is to provide improved means for sealing out mud and other fluid found in the well from the instrument.

Another object is to provide improved means of centering a tool within pipe to allow measurements of the amount of twist in a pipe.

With the foregoing and other objects in view, which will be made manifest in the following detailed description and specifically pointed out in the appended claims, reference is had to the accompanying drawings for an illustrative embodiment of the invention, wherein:

FIGS. 1A and 1B disclose an apparatus embodying the present invention as being lowered in pipe with the pipe being cut away;

FIGS. 2A, 2B, 2C, and 2D disclose successive portions in section of the apparatus disclosed in FIGS. 1A and 1B with some of the sections being broken for convenience;

FIG. 7 is a perspective view of the inductance means device showing the upper and lower portions of the core; and FIG. 8 is a view similar to FIG. 4, showing the parts of the core separated as if the pipe had been twisted.

Figures 3A, 3B:
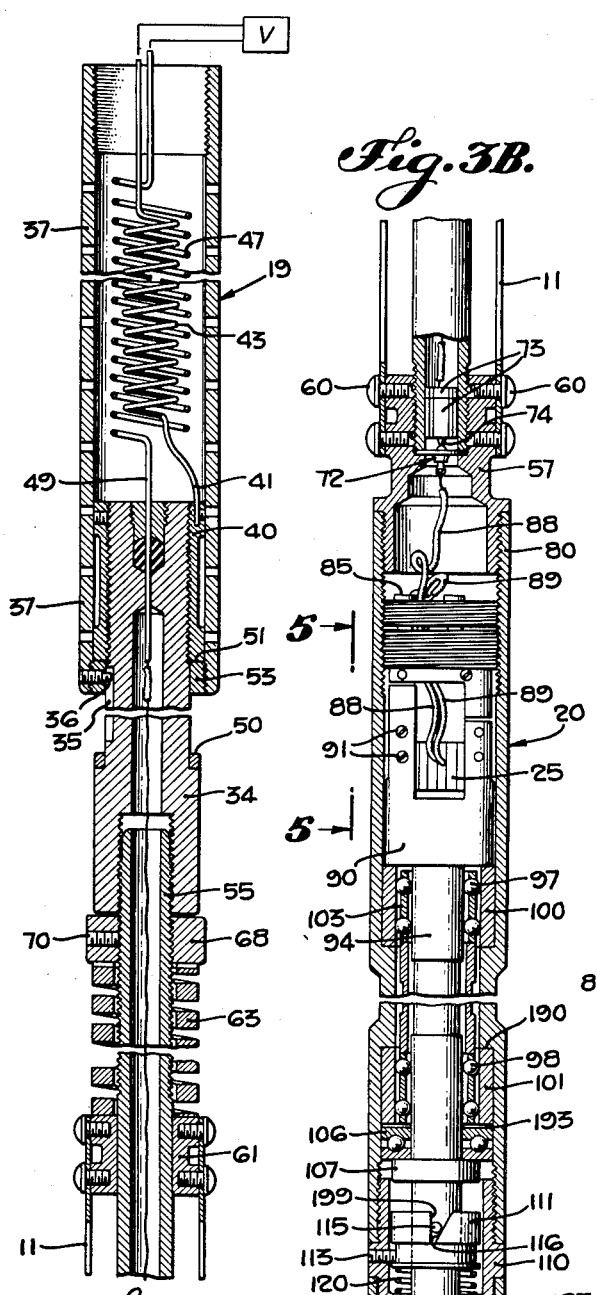
FIGS. 3A and 3B are views similar to FIGS. 2A and 2B with parts of the device in set position.

Referring to the accompanying drawings wherein similar reference characters designate similar parts throughout, FIGS. 1A and 1B show an apparatus embodying the present invention having been lowered within a pipe 10, the instrument being frictionally supported by belly springs 11 and 12 within pipe 10. The apparatus is lowered into the pipe and forced to move down within the pipe by means of weights 14 which are connected by a rope socket to an electric conductor cable 15 which extends through the weights to supply electric energy to a circuit to be described. The weights have jars 19 provided on the lower end thereof to engage the upper portion of the instrument. The sensing unit portion of the device is essentially the sensing portion of an electrical strain gauge and comprises an upper portion generally designed 20 which carries one part of a separable core and a lower part 21 which carries the other part of a separable core, part 20 being supported in the pipe 10 by belly spring 11 and the part 21 being supported in the pipe by belly spring 12, the upper and lower main parts of the sensing unit being connected together so as to permit limited rotational and longitudinal movement between parts of the core as will be described hereinafter in detail. The belly springs 11 and 12 serve the important function of centering and frictionally seating the sensing unit at two vertically spaced points within the pipe, casing, or the like, into which it is lowered, thereby permitting the sensing unit to measure deformational changes in the pipe, casing, or the like between said points.

Figure 5:
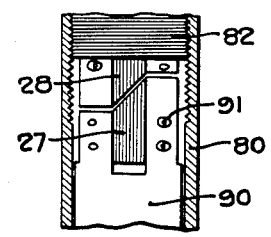
FIG. 5 is a view similar to FIG. 4, in which the parts of the core are shown as having been separated longitudinally, taken along the lines 5—5 of FIG. 3B.
Figure 6:
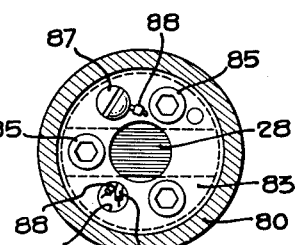
FIG. 6 is a sectional view along lines 6—6 of FIG. 2B.

In further detail, the sensing unit is a variable inductance and comprises a coil 25 and a separable core having a lower part 27 and an upper part 28, the parts of the core being separable along inclined planes with respect to the longitudinal central axis of the instrument, the inclined planes being approximately 180° apart as can be seen from FIG. 7. It is preferred that the parts of the core separate along a plane making approximately 45° to the longitudinal axis of the instrument but other angles can be used. By providing separation along inclined planes the sensing unit can give indications upon either longitudinally stretching the pipe or upon twisting of the pipe. That is, as can be seen by comparing FIGS. 5 and 8, the air gap between the parts of the core is varied when the parts of the core are separated either longitudinally or rotationally and this variation in the air gap can be measured in a suitable manner to indicate the amount of strain either longitudinally if the pipe is stretched, or torsionally in the pipe, in case the pipe is twisted.

The upper part of the core 28 is connected to belly spring 11 and belly spring 11 has sufficient frictional engagement with the inside of pipe 10 to remain fixed to the pipe upon stretching, twisting or compression of the pipe. The lower part 27 of the core is connected to belly spring 12 and belly spring 12 also frictionally engages the pipe 10 with sufficient force so as to remain stationary when the pipe is either twisted or stretched or compressed longitudinally. Therefore, the belly springs 11 and 12 can be considered as means whereby the upper and lower portions of the core can be fixed to the pipe and since the sensing unit is designed to permit limited rotational and longitudinal movement between parts 27 and 28 any straining either from longitudinal compression or tension or from twisting can be measured by measuring the variations caused in the air gap between the parts of the core.

The upper part 20 of the sensing unit comprises a member 34 which is provided with a keyway 35 to receive a pin 36, see FIG. 2A, said pin being provided on perforated sleeve 37 of the jars 19. Member 34 has an adapter 40 on the upper end thereof to which a ground wire 41 is fastened, said ground wire leading to an inner spring or coil 43 which has a lead extending upwardly to the surface where it is connected in a suitable electric circuit for measuring the variations in air gap. There is an outer spring or coil 47 which carries current by means of lead 49 down to the inductance means, and these springs 43 and 47 provide stretchable conductors for allowing movement between the jars 19 and upper part 20 of the sensing unit, this movement being necessary for the purposes of setting the sensing unit while it is in the well, which will be described hereinafter. The outer conductor spring 47 is insulated and the inner conductor ground spring 43 may be bare.

The perforations in sleeve 37 allows the fluid within the well to enter into the sleeve, as the displacement of the jars varies, to compensate therefor. It is also desirable to allow fluid to enter within the sleeve for pressure equalization purposes.

Part 34 provides a shoulder 50 and adapter 40 provides a shoulder 51, said shoulders providing stops to limit the extent of travel of the jars 19, the stops 50 and 51 being contacted by sleeve 53 which is threaded onto the lower end of perforated sleeve 37.

Member 34 is internally threaded to receive a tube 55, said tube being in turn threaded to an adapter member 57 which receives the lower ends of belly springs 11 which are fastened to said adapter member by screws 60. The upper ends of belly springs 11 are fastened to a sleeve 61 which slides along tube 55 and there is a compression spring 63 provided between sleeve 61 and collar 68 which collar is threadedly receivable by tube 55 and set on tube 55 by means of set screw 70.

An electrical connector 72 is disposed between tube 55 and adapter member 57 and this electrical connector not only physically separates the hollow portions of tube 55 and member 34 from the lower portions of part 20, but also provides a convenient means of assembling the apparatus. Connector 72 comprises insulating members 73 which are forced within tube 55 and which contain a spring pressed contact 74 which is connected to lead 49, and a lower member 75 which has flanges disposed between tube 55 and adapter member 57. There is a contact 77 in the center of member 75 which is insulated from the flange of member 75 and adapted to be contacted by spring pressed contact 74.

There is an aperture 76 provided in the upper portion of member 34 serving as a pressure transfer port to grease or the like which fills member 34 and tube 55 down to the connector 72. This grease serves to provide a fluid within the instrument to equalize the pressure. Lead 49 extends down through member 34 and tube 55 to connector 72, and this lead is insulated so it is not affected by any fluid which may enter through sleeve 37 and aperture 76 to exert pressure on the grease within the part 20.

Adapter 57 is externally threaded to receive a sleeve 80 to which the upper portion 28 of the core is fastened. The upper portion 28 of the core is mounted on a lower threaded ring 82, said threaded ring having an upper threaded ring 83 disposed thereabove and connected thereto by screws 85, see FIGS. 2B and 7. The threaded rings 82 and 83 are screwed down into sleeve 80 with the threaded rings approximately a thread apart and then the screws 85 are tightened down to lock the rings, thus definitely locating upper core 28 within sleeve 80. There is a suitable binding post 87 to receive a ground lead 89 for the coil 25, and since the conductor 41, see FIG. 2A, is fastened to sleeve 40 there is an electrical connection between conductor 41 and lead 89 through the body of the tool. A lead 88 extends from connector 72 through the rings 82 and 83 to coil 25, thus completing a circuit from conductor 49 through coil 25, through ground to conductor 41.

Coil 25 and the lower portion 27 of the core of the inductance means are mounted within a plug member 90 by means of suitable screws 91 and the like, said plug member being threaded onto a tube 94, as shown in FIG. 2B, and is adapted to be fixedly fastened to tube 94 by means of detent pins 95 which are adapted to be moved outwardly by tapered cam member 96 which is preferably internally broached to receive a suitable turning tool by which the cam member may be turned at the time of assembly. Tube 94 is supported within sleeve 80 by bearings 97 and 98 which ride on inner races provided but tube 94 and on outer races provided by sleeves 100 and 101 which are fixed to sleeve 80. There are suitable retainers 103 for the bearings. The bearings 98 and 97 serve to maintain the lower core 27 in alignment with the upper core 28. There is a lower bearing 106 which rests on a collar 107 provided on tube 94, bearing 106 being loosely received by sleeve 80 so that vertical relative movement between bearing 106 and the sleeve is permitted.

Bearings 97, 98, and 106 therefore serve the important function of keeping the tool in accurate alignment while permitting rotational and longitudinal movement between parts 27 and 28 of the core.

Sleeve 80 has an extension 110 threadedly connected thereto within which there is a cam sleeve 111. Cam sleeve 111 fits around tube 94 with clearance but fits within extension 110 so that it can be effectively fixed to extension 110 by means of a set screw 113. There is a pin 115 on tube 94 disposed within a notch or slot 116 provided in cam sleeve 111. The various parts of the apparatus are so designed that the pin 115 never leaves the tapered notch or slot 116 but is allowed to rise and descend within limits within the slot or notch. The lower limit of travel of pin 115 and therefore part 27 of the core is determined by race 100 which acts as a stop which plug member 90 engages. Cam sleeve 111 is so adjusted that pin 115 is positioned at the bottom of slot 116 when plug member 90 engages sleeve 100. Collar 107 in conjunction with bearing 106 and outer race 101 determines the upper limit to which the part 27 of the core can move with relation to the upper part 28. In actual practice the limits of movement allowed by pin 115, cam sleeve 111, and the other mentioned parts will be such that the upper and lower parts of the core will never actually come in contact with one another and on the other hand will never be allowed to move very far apart, probably not over 1/16" in most instances. Therefore, although the lower part 21 of the instrument can move both longitudinally and rotationally freely with respect to upper part 20 there are definite limits to this movement.

There is a spring 120 which is used when assembling the parts to hold the cam sleeve 111 up against pin 115 but after the set screw 113 is set the spring 120 no longer performs any function.

The tube 94 extends downwardly and is threadedly receivable by an adapter 122, said adapter having a collar 123 threadedly receivable thereon and a collar member 124 threadedly receivable thereon, said collars cooperating to lock either one against movement after they are set. Belly spring 12 is carried by a tube 130, said tube 130 having a collar 132 threaded on the upper end thereof and locked thereto by set screws 134, the outer surface of collar 132 fitting neatly within a bore provided in adapter 122 so that tube 130 can rotate with respect to tube 94. There is a spring 137 resting against a flange provided by a collar 124, said spring serving to keep collar 132 up against the shoulder provided by adapter 122. The springs 137 provides a frictional force between collar 132 and adapter member 122 of a sufficient extent so that whenever the instrument is set in the well and the pipe is twisted or strained that the resulting movement transmitted to the instrument will not take place at the rotational friction joint provided by the collar 132 but will take place between the cores of the inductance means. Therefore, the rotational joint provided at 132 permits the upper and lower belly springs to rotate relative to one another when the tool is being raised or lowered by overcoming the friction force provided by the spring 137. This frictional force, however, is of sufficient amount to prevent rotation between the lower and upper parts of the lower part 21 of the instrument during twisting and stretching of the pipe. The friction joint at 132 also permits the parts of core to move relative to one another during a resetting operation as will be described, without relative movement between belly springs 11 and 12. There is a nut 140 threaded onto lower tube 130 and set therein for the purpose of adjusting the tension on compression spring 142 which, in turn, bears against sleeve 143 and causes belly spring 12 to belly outward. Belly spring 12 is attached at its upper end to a slidable sleeve 146 and at its lower end to a fixed sleeve 147. There is a suitable bottom member 149 on the lower end of tube 130, said member being provided with aperture 150 to permit mud or fluid within the well to pass unwardly within tube 130 to fill the tube to equalize the pressure outside and inside the device.

The middle portion of the instrument from the connector 72 down to tube 130 is filled with an inert fluid such as fluid silicone and this fluid is kept within the middle portion of the instrument by pipe plug 161. There is a perforated sleeve 163 fixed to adapter 122, as shown in FIG. 2C. The upper end of sleeve 163 loosely fits about member 110 so that sleeve 163 can slide relative to member 110. This is necessary since sleeve 163 is connected through adapter 122 and tube 94 to the lower part 27 of the core while member 110 is connected by means of sleeve 80 and threaded ring 82 to the upper part 28 of the core. There is a flexible sleeve 168 which is fastened at its lower ends by wire binding 169 to the upper portion of adapter 122 which is suitably grooved to receive the impressed portions caused by binding wire 169 and the upper portion of flexible sleeve 168 is fastened by binding wire 170 to the lower end of member 110 which is suitably grooved to receive the impressed portions caused by binding wire 170. Flexible sleeve 168 serves to equalize the pressure outside and inside the instrument and has sufficient flexibility to readily allow the small amount of movement between the upper and lower portions of the core of the inductance means.

The electrical circuit of the specific embodiment of the invention disclosed in the drawings is fairly conventional. The inductance means is energized from the surface by the conductors leading to stretchable spring conductors 43 and 47 and conductors 49 and 41. Threaded rings or discs 82 and 83 are provided with aligned apertures 181 to permit the current carrying conductors to pass therethrough and down to coil 25 as best seen in FIG. 3B. The inductance means will be energized by alternating current preferably of a fairly low frequency.

As typical but not as a limiting illustration a sixty cycle alternating current may be employed which is stepped down by means of a transformer to six volts. Suitable condensers may be placed in series with the inductance providing a series circuit. By adjustment or proper selection of the condensers the reactance may be such that when there is a minimum inductance (i.e., maximum air gap) the voltage impressed upon the coil 25 will be approximately one-half volt.

Any suitable means for measuring the voltage across the inductance may be employed at the surface illustrated diagrammatically at the tops of FIGS. 2A and 3A and preferably the current in the circuit is rectified. The resulting pulsating direct current may be smoothed out by suitable condensers so that the voltage meter will not fluctuate. Considerable variation in the means for determining the variation in the inductance occasioned by the increase or decrease of the air gap is permissible.

As variations in the air gap between the parts 27 and 28 of the separable core vary the inductance of the inductance means and therefore, the reactance of the circuit varies. There is a minimum voltage and a minimum inductance when the air gap is at a maximum, and there fore, a minimum reactance. Therefore, when the meter at the surface shows that the voltage is increasing it is known that the air gap is decreasing in thickness and when the voltage decreases it is known that the air gap is increasing. In order to conveniently read the meter a bucking voltage can be used at the surface so that when the voltage on the inductance means decreases the meter reading will increase, and therefore the meter will indicate increasing thicknesses of air gap instead of decreasing as it would with a direct connection and without the opposing or bucking voltage. As has been before explained, the air gap will be increased in thickness whenever the pipe is stretched longitudinally or twisted since the separate parts of the core of the inductance means are mounted so that their opposed faces are inclined with respect to the longitudinal axis of the casing and the instrument.

The operation of the instrument has been explained along with the detailed description, but a summary will be given for purposes of clarity. The parts of the instrument as the instrument is depicted in FIGS. 2A, 2B, 2C, and 2D are in that position the instrument assumes when it is being forced downwardly through the pipe. It can be seen from FIG. 2A that the weights have forced the jars down on member 34 which forms part of the upper part of the instrument 20 thereby forcing the upper part of the instrument downwardly, and since the upper part of the instrument bears on the lower part 21 of the instrument through shoulder 190 of sleeve 80, outer race 101, bearing 106, and collar 107, the lower part of the instrument 21 will likewise be forced downwardly and will move upwardly with respect to upper part 20, the maximum amount of its limited movement so that a space 191 will be provided between outer race 100 and plug member 90 which supports the lower part of the separable core 27 as shown in FIG. 2B. The pin 115 will be positioned in the top part of the notch or slot 116 provided in cam sleeve 111 and pin 115 can move rotationally within the limits of the notch 116. During the downward movement rotational movement of belly spring 12 with relation to belly spring 11 is allowed by the joint at sleeve 132, see FIG. 2C, so that if any of the conditions in the pipe tend to urge the lower belly spring 12 to rotate this is allowed by the joint above mentioned. When the tool has been lowered to the point at which it is desired to take a reading the weights and jars will be raised so that the jars bear against sleeve or collar 51 and therefore raise the upper part of the instrument 20 with relation to the lower part of the instrument 21 and close the gap 191 since the belly spring 12 will tend to hold the lower part of the member 21 in its lowermost position. A gap 193, see FIG. 3B, will be created between the outer race 101 and the bearing 106, the outer race being fixed to sleeve 80 as heretofore described, and bearing 106 allowed to move freely along sleeve 80 as hereinbefore set out. The jars and weights are moved upwardly a distance sufficient to make certain that the pin 115 has been moved downwardly so as to be set or centered by the notch 116 and at this time the upper and lower parts of the core are in the position shown in FIG. 5, or, in other words, in a definite or known position with respect to each other, considered rotationally. The friction joint at 132 permits the parts of core to be realigned in torque without necessarily involving movement of belly springs 11 and 12 relative to the casing or to one another. Although the core parts 27 and 28 are in correct rotational alignment there is a maximum air gap and this maximum air gap is decreased by again lowering the jars 19 and moving the upper part 20 downwardly a slight extent and during this movement pin 116 will move upwardly keeping close to the vertical wall 199 forming the left-hand side of slot 116. After this, the jars 119 are raised slightly to be in an intermediate or neutral position between that position shown in FIGS. 2A and that position shown in FIG. 3A wherein neither the cable, the weight nor the jars have any influential effect on the sensing means 25, 27, and 28 which are frictionally set and supported by their respective belly springs on the interior of the pipe. The air gap between the separable parts of the core is now at a minimum and of a known magnitude and the parts of the core will be positioned as shown in FIG. 4.

The above movements of the jars and the upper and lower parts 20 and 21 are necessary since during the lowering of the instrument into the well it is possible that the pin 115 will move to the right of the position as depicted in FIG. 2B, and therefore the separable parts 27 and 28 of the core will be separated rotationally an unknown distance. But with the above described movements the pin 115 is centered or set by the decribed movements and then allowed to move upwardly along wall 199 to an upper position where rotational movement of pin 115 from one side of the slot 116 to the other is permitted. In this manner the relation of parts 27 and 28 to each other is at a known relation after the tool has been moved from one location in the pipe to another. This resetting or "zero-ing" of the instrument takes place after the tool has been set at the location to be tested and while the tool remains frictionally seated at this location. The resetting of the sensing means is accomplished by manipulation of the cable, weight and jars.

Figure 4:
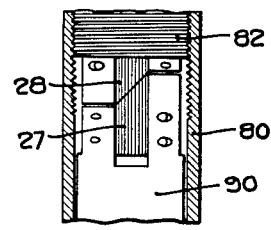
FIG. 4 is a sectional view of the variable inductance and its core showing the position of the parts of the core when the parts of the core have been set, taken along the lines 4—4 of FIG. 2B.

After the instrument is set as shown in FIG. 4, the pipe can be twisted from the surface in a direction such as to cause pin 115 to move to the right of the position depicted in FIG. 2B, and the separable parts of the core 27 and 28 to move to a position shown in FIG. 8. If, however, the pipe is stuck at the location of the instrument there will be no twisting of the pipe between belly springs 11 and 12 and therefore the separable parts of the core will not separate and therefore the air gap remains constant and the voltage across the inductance means will remain constant which readings at the surface will indicate that the pipe is stuck at the location of the instrument. If such is the case the instrument is raised and set at another location in the pipe until the separable core separates to vary the inductance and either increase or decrease the voltage at the surface depending upon the wiring setup. In order to gain complete knowledge of the conditions around the pipe the instrument can be reset at each location and the pipe stretched longitudinally and again the separable parts of the core will be separated if the pipe is free at the location of the instrument increasing the air gap and variations in the voltage across the inductance means can be observed at the surface. It is also possible with one setting of the instrument to twist the casing to obtain a reading and then stretching the casing while it is twisted or releasing the twist and stretching the casing to obtain both a torsional and longitudinal strain reading with the same setting of the tool. All that is necessary is a change of stress in the pipe of a magnitude which would normally cause a deformational change in the pipe between the points where the belly springs frictionally seat and support the tool when the influence of the cable, weight, and jars is removed by positioning these parts in the intermediate or neutral position. It is obvious that the instrument of the present invention can be used to determine either longitudinal strain or torsional strain separately or in combination whenever desired.

The method performed in ascertaining whether a pipe is stuck or free in the well at a selected locality is to insert the strain-sensing means with its associated belly springs, friction joint, and re-setting mechanism in the pipe along with the lowering and recovering cable 15 and the associated weight and jars. The sensing means can be moved vertically either upwardly or downwardly by raising or lowering the cable 15 and the associated weight and jars and thus be positioned at the locality in the pipe that is to be tested. At this locality the belly springs 11 and 12 frictionally seat the sensing means on the interior of the pipe. If the instrument has been lowered to the locality to be tested the cable is then lifted, causing the pin 115 to descend relatively to the walls of notch 116 overcoming the friction at friction joint 132 and thus rotationally set the sensing means at a known or starting point. This can be accomplished without necessarily disturbing the frictional seating of the belly springs 11 and 12 at the locality to be tested but even if these belly springs should be slightly disturbed, the sensing means will nevertheless be rotationally set or "zeroed" rotationally.

The next step in the method is to lower the cable 15 to assure by means of the engagement between 53 and shoulder 50 that the sensing means is vertically closed, that is, that the core parts 27 and 28 have been set to a known or starting position vertically. Thereafter, the cable is lifted to intermediate or neutral position wherein 53 engages neither shoulder 50 nor shoulder 51 so that the cable, weight, and jars have no influence on the functioning of the sensing means.

It is of considerable importance to have the positions of the core parts 27 and 28 at a known position prior to the commencement of the test due to the fact that the reading obtained in an inductance-type strain-sensing element of this character is not linear or directly proportional to the air gap between these parts. If the core parts 27 and 28 are very close together at the commencement of the test an opening of the gap a given distance will produce a reading of a certain magnitude at the surface.

However, if the core parts 27 and 28 are considerably spaced at the commencement of the test an opening of the air gap the same distance will not give a corresponding reading on the surface instrument. In order to quantitatively ascertain how much deformation has taken place between the belly springs 11 and 12 in response to the stress change, it is important and highly desirable that the core parts 27 and 28 be re-set to a known initial position prior to the performance of each test. When the core parts have been thus re-set by the manipulation of cable 15 the pipe is subjected to a change of stress either by applying forces to the pipe or relieving applied forces and whether or not deformation of the pipe between the belly springs 11 and 12 has taken place as a result thereof, is ascertained from the inductance-type sensing element.

Strain gauges have heretofore been devised employing as their sensing elements two opposed cores which are movable relatively to each other in response to strain imposed on the part on which the cores are mounted. Such strain gauges have also employed a winding which may be wound on either or both cores. Because of the similarity of the winding 25 and the cores 27 and 28 to the sensing elements of such strain gauges, these parts of the device disclosed herein may be conveniently referred to as a strain gauge.

Insofar as the present invention is concerned other known types of electrically operated strain gauges may be substituted for the strain gauge illustrated.

Various changes may be made in the details of construction without departing from the spirit of the invention as defined by the appended claims.

I claim:

1. An instrument of the class described comprising a conductor cable adapted to be lowered into a pipe in a well, a weight connected thereto so as to be suspended thereby, upper and lower seating means adapted to seat against the interior of the pipe at upper and lower points respectively, means including an electrical strain gauge responsive to vertical strains of the pipe connecting the upper and lower seating means, means permitting but limiting vertical movement of the weight relatively to the seating means whereby the weight may force the seating means downwardly in the pipe to said upper and lower points respectively and thereafter the weight may be lifted by the conductor cable to a neutral position to take the weight off the seating means, and means electrically connected through the conductor cable to the strain gauge for determining whether a change of position of the seating means has occurred due to a strain or change of strain imposed on the pipe.

2. An instrument of the character described comprising a conductor cable adapted to be lowered into a pipe in a well, upper and lower seating means adapted to be seated against the interior of the pipe at upper and lower points respectively, an electric strain gauge, means connecting the strain gauge to the upper and lower seating means so that the strain gauge will be responsive to a change of position of one seating means relative to the other, said means including a friction joint, means connected to the strain gauge for overcoming the friction of the friction joint and setting the strain gauge to a pre-arranged initial position while the seating means remains stationarily seated against the pipe, and means electrically connected to the conductor cable for detecting whether the strain gauge has been actuated in response to a change of position of one seating means relatively to the other because of a strain or change of strain imposed on the pipe.

3. An instrument of the character described comprising a conductor cable adapted to be lowered into a pipe in a well, a weight connected thereto so as to be suspended thereby, upper and lower seating means adapted to seat against the interior of the pipe at upper and lower points respectively, an electrical strain gauge connected to said upper and lower seating means responsive to vertical and rotational changes of position of said upper and lower seating means relatively to each other, means permitting but limiting vertical movement of the weight relative to the seating means whereby the weight may force the seating means downwardly within the pipe and then be lifted by the conductor cable to a neutral position to take the weight off the seating means, and means electrically connected through the conductor cable to the strain gauge for determining whether a change of position of one seating means relatively to the other has occurred due to a strain or change of strain imposed on the pipe.

4. An instrument of the character described comprising a conductor cable adapted to be lowered into a pipe in a well, a weight connected thereto so as to be suspended thereby, upper and lower seating means adapted to seat against the interior of the pipe at upper and lower points respectively, an electrical strain gauge connected to said upper and lower seating means responsive to vertical and rotational changes of position of said upper and lower seating means relatively to each other, means permitting but limiting vertical movement of the weight relative to the seating means whereby the weight may force the seating means downwardly within the pipe and then be lifted by the conductor cable to a neutral position to take the weight off the seating means, means electrically connected through the conductor cable to the strain gauge for determining whether a change of position of one seating means relatively to the other has occurred due to a strain or change of strain imposed on the pipe, the connecting means between the strain gauge and at least one seating means including a friction joint, and means operable by the weight moving to one extreme so as to limit movement relatively to the seating means for overcoming the friction of the friction joint and setting the strain gauge to a predetermined initial position.

5. An instrument of the class described comprising a conductor cable adapted to be lowered into a pipe in a well, a weight connected thereto so as to be suspended thereby, upper and lower sets of belly springs adapted to frictionally engage the interior of the pipe at upper and lower locations respectively, an electric strain gauge responsive to vertical changes of position of the belly springs relative to each other connected to the upper and lower sets of belly springs, means permitting but limiting vertical movement of the weight relative to the belly springs whereby the weight may force the belly springs downwardly into the pipe and when at one extreme of its limited movement relative to the belly springs it may set the strain gauge to a predetermined initial position and then be moved to a neutral position intermediate the ends of its limited movement, and means electrically connected to the strain gauge through the conductor cable for determining whether the strain gauge has been actuated by a change of position of one set of belly springs relative to the other due to a strain or change of strain imposed upon the pipe.

6. An instrument of the class described comprising a conductor cable adapted to be lowered into a pipe in a well, upper and lower seating means connected thereto adapted to be seated against the interior of the pipe at upper and lower points respectively, an electric strain gauge responsive to rotational change of position of one seating means relatively to the other, means connecting the strain gauge to the upper and lower seating means, said means including a rotary friction joint, means operable by the conductor cable connected to the strain gauge, for overcoming the friction of the friction joint and setting the strain gauge to a predetermined initial position, and means electrically connected to the strain gauge through the conductor cable for determining whether the strain gauge has been disturbed from said initial position by a strain or change of strain imposed upon the pipe.

7. An instrument of the class described comprising a conductor cable adapted to be lowered into a pipe in a well, upper and lower sets of belly springs connected thereto adapted to be temporarily and frictionally seated against the interior of the pipe at upper and lower points respectively and to center the instrument with respect to the pipe, an electric strain gauge responsive to vertical and rotational changes in position of one set of belly springs relatively to the other, means including a friction joint connecting the strain gauge to said sets of belly springs, means connected to the strain gauge for overcoming the friction of the friction joint and setting the strain gauge to a predetermined initial position while the belly springs remain seated in the pipe, and means electrically connected to the strain gauge through the conductor cable for determining whether the strain gauge has been disturbed from said initial position by a strain or change of strain imposed upon the pipe.

8. An instrument of the class described comprising a conductor cable adapted to be lowered into a pipe in a well, a weight connected thereto so as to be suspended thereby, upper and lower sets of belly springs adapted to be frictionally and temporarily seated against the interior of the pipe at upper and lower points respectively and to center the instrument with respect to the pipe, a variable inductance-type strain gauge having opposed cores with mutually engageable inclined pole faces spaced from the vertical central axis of the instrument so as to be separable when the cores are moved vertically one relatively to the other or separable when the cores are moved rotationally one relatively to the other, means connecting the cores of the variable inductance permitting but limiting vertical and rotational separation, means including a friction joint connecting one of said cores to the lower set of belly springs, means connecting the other of said cores to the upper set of belly springs, means connecting the weight to the upper set of belly springs, said means permitting but limiting vertical movement of the weight relative to the upper set of belly springs, cam means connected to the upper set of belly springs operable when the weight is lifted to the extreme of its movement relative to the upper set of belly springs for overcoming the friction of the friction joint and orienting the core associated therewith to a predetermined position relative to the other core, and means electrically connected to the strain gauge through the conductor cable for determining whether one core has moved relatively to the other due to a strain or change of strain imposed on the pipe.

9. An instrument of the character described adapted to be lowered into a pipe in a well bore to detect straining or movement in the pipe, comprising a housing divided into two sections, said sections being loosely interconnected for movement relative to each other, springs mounted on said two sections respectively for continuous frictional engagement with said pipe with sufficient pressure to make the two sections self-supporting in the pipe, a magnetic strain gauge in said housing responsive to relative movement between said two sections, conducting means to extend from the surface of the well through said pipe and into said housing to form an electric circuit including said magnetic strain gauge, an indicating instrument in said circuit at the surface responsive to said strain gauge, and means movably connected to the housing for movement relatively thereto adapted to be lowered into the pipe to apply force to said housing to raise and lower said housing through the pipe by overcoming the continuous frictional resistance of said springs and thereafter be moved relatively to the housing so as to leave the housing self-supported in the pipe by said springs and uninfluenced by the last-mentioned means.

10. The method of ascertaining where a pipe may be stuck in a well or where it is free which includes seating a strain-sensing means in the pipe at two vertically spaced points at the locality to be tested, setting the strain-sensing means at a known position while seated, subjecting the pipe above the strain-sensing means to a change of stress capable of deforming the pipe between said spaced points and ascertaining from the strain-sensing means whether the pipe has been deformed between said points in response to said change of stress.

11. The method of ascertaining where a pipe may be stuck in a well or where it is free which includes seating a strain-sensing means in the pipe at two vertically spaced points at the locality to be tested, rotationally setting the sensing means at a known position while seated, subjecting the pipe to a change of rotational stress capable of deforming the pipe between said spaced points, and ascertaining from the strain-sensing means whether the pipe has been rotationally deformed between said points in response to said change of stress.

12. The method of ascertaining where a pipe may be stuck in a well or where it is free which includes frictionally seating in the pipe at two vertically spaced points a strain-sensing means having a weight and a lowering and recovering cable loosely connected thereto, vertically moving the cable and weight to overcome the frictional seating of the sensing means and moving the sensing means to the locality in the pipe that is to be tested where it may again frictionally seat, raising the cable and weight relative to the sensing means to rotationally set the sensing means at a known position, lowering the cable and weight relative to the sensing means to a neutral position wherein the sensing means is free to function without being influenced by the cable and weight, subjecting the pipe above said spaced points to a change of stress capable of rotationally deforming the pipe between said spaced points, and ascertaining from the strain-sensing means whether rotational deformation has occurred between said spaced points in response to said change of stress.

13. The method of ascertaining where a pipe may be stuck in a well or where it is free which includes frictionally seating in the pipe at two vertically spaced points a strain-sensing means having a weight and a lowering and recovering cable loosely connected thereto, vertically moving the cable and weight to overcome the frictional seating of the sensing means and moving the sensing means to the locality in the pipe that is to be tested where it may again frictionally seat, moving the cable and weight relative to the sensing means in the opposite direction from that in which it moved in moving the sensing means to the locality to be tested to rotationally set the sensing means at a known position, moving the cable and weight relative to the sensing means in the first direction to set the sensing means in a known position longitudinally, shifting the cable and weight relative to the sensing means to a neutral position wherein the sensing means is free to function without being influenced by the cable and weight, subjecting the pipe above said spaced points to a change of stress capable of deforming the pipe between said spaced points, and ascertaining from the strain-sensing means whether rotational deformation has occurred between said spaced points in response to said change of stress.

14. The method of ascertaining where a pipe may be stuck in a well or where it is free which includes frictionally seating in the pipe at two vertically spaced points a strain-sensing means having a weight and a lowering and recovering cable loosely connected thereto, vertically moving the cable and weight to overcome the frictional seating of the sensing means and moving the sensing means to the locality in the pipe that is to be tested where it may again frictionally seat, moving the cable and weight relatively to the sensing means to set the sensing means in a known position, longitudinally shifting the cable and weight relative to the sensing means to a neutral position wherein the sensing means is free to function without being influenced by the cable and weight, subjecting the pipe above said spaced points to a change of longitudinal stress capable of longitudinally deforming the pipe between said spaced points and ascertaining from the strain-sensing means whether longitudinal deformation has occurred between said spaced points in response to said change of stress.

15. An instrument for ascertaining where a pipe may be stuck in a well or where it is free comprising vertically spaced belly springs adapted to frictionally seat at vertically spaced points on the interior of the pipe, a strain-sensing means connecting the belly springs, the connection between the strain-sensing means and one set of belly springs including a friction joint enabling the strain-sensing means to be at a known position relatively to the belly springs, a lowering and recovering cable and weight loosely connected to the sensing means and belly springs, and means operable by moving the lowering and recovering cable and the weight relatively to the sensing means for setting the sensing means at a known position by overcoming the friction of said friction joint.

16. A device for determining where a pipe is stuck in a well and where it is free comprising a variable inductance having opposed cores, means for temporarily mounting each core on the interior of a pipe at the locality to be tested, said means including a rotational friction joint enabling one core to be rotated relatively to the other while mounted on the pipe by overcoming the friction of the friction joint, means loosely connecting the cores to each other enabling one core to move vertically relatively to the other, a conductor cable by which the cores may be lowered into the pipe and recovered therefrom, a weight suspended by the conductor cable having a limited movable connection with the upper of said cores and by which the cores may be vertically positioned at a known position at the locality to be tested, means operable by the weight and conductor cable for rotationally positioning the cores at a known position by overcoming the friction of the friction joint, and means for electrically determining whether the cores have changed positions relative to each other by a change of stress in the pipe.

17. The method of determining the approximate depth above which a stuck pipe in a well is free which includes mounting a strain-sensing means upon two spaced points or locations in the pipe so that the strain-sensing means will be affected by a change in position of one of said points or locations relatively to the other, setting the strain-sensing means to a known initial position while it is thus mounted, subjecting the pipe to a strain or change of strain to vary the position of said points with respect to each other if the points are at a location on the pipe which is free, and ascertaining from the strain-sensing means whether or not the strain-sensing means indicates a change in relative position of said points in response to said strain or change of strain.

18. The method of determining the approximate depth above which a stuck pipe in a well is free which includes mounting a strain-sensing means upon two spaced points or locations in the pipe so that the strain-sensing means will be affected by a chage in position of one of said points or locations relatively to the other, setting the strain-sensing means to a known initial position while thus mounted and without disturbing the mounting on the pipe, subjecting the pipe to a strain or change of strain to vary the position of said points with respect to each other if the points are at a location on the pipe which is free, and ascertaining from the sensing means whether or not a change occurs in the relative position of said points in response to said strain or change of strain.

References Cited in the file of this patent
UNITED STATES PATENTS

| | | |
|---|---|---|
| 2,045,474 | Kemler | June 23, 1936 |
| 2,233,740 | Heater | Mar. 4, 1941 |
| 2,300,384 | Johnston | Oct. 27, 1942 |
| 2,436,047 | Martin | Feb. 17, 1948 |
| 2,530,309 | Martin | Nov. 14, 1950 |
| 2,550,964 | Brookes | May 1, 1951 |
| 2,716,890 | Martin | Sept. 6, 1955 |